US007151122B2

(12) United States Patent
DeSaw et al.

(10) Patent No.: US 7,151,122 B2

(45) Date of Patent: Dec. 19, 2006

(54) UV CURABLE POLYSILOXANE CLEARCOAT

(75) Inventors: Shawn DeSaw, McMurray, PA (US); Dennis Simpson, Saver, PA (US); Deborah E. Hayes, Verona, PA (US); Lawrence G. Anderson, Pittsburgh, PA (US); Kaliappa G. Ragunathan, Gibsonia, PA (US); Richard J. Sadvary, Pittsburgh, PA (US)

(73) Assignee: PGG Industries Ohio, Inc., Cleveland, OH (US)

( * ) Notice: Subject to any disclaimer, the term of this patent is extended or adjusted under 35 U.S.C. 154(b) by 34 days.

(21) Appl. No.: 10/842,161

(22) Filed: May 10, 2004

(65) Prior Publication Data

US 2004/0214911 A1 Oct. 28, 2004

Related U.S. Application Data

(63) Continuation-in-part of application No. 09/629,422, filed on Jul. 31, 2000.

(51) Int. Cl.

*B32B 27/28* (2006.01)
*C08G 71/04* (2006.01)
*C08G 77/20* (2006.01)

(52) U.S. Cl. .......................... 522/90; 522/172; 522/99; 528/33; 428/447

(58) Field of Classification Search .................. 522/90, 522/170, 172, 99; 428/290; 528/33
See application file for complete search history.

(56) References Cited

U.S. PATENT DOCUMENTS

| | | | | |
|---|---|---|---|---|
| 4,271,223 | A * | 6/1981 | Lambert et al. | 428/207 |
| 4,605,712 | A | 8/1986 | Mueller et al. | 525/474 |
| 4,684,538 | A | 8/1987 | Klemarczyk | 427/54.1 |
| 4,971,837 | A | 11/1990 | Martz et al. | 422/388.2 |
| 5,026,448 | A | 6/1991 | Reafler et al. | 156/212 |
| 5,492,731 | A | 2/1996 | Temple et al. | 427/407.1 |
| 5,939,491 | A * | 8/1999 | Wilt et al. | 525/100 |
| 5,976,343 | A | 11/1999 | Schlaak | 205/198 |
| 6,087,436 | A | 7/2000 | Larrow et al. | 524/517 |
| 6,296,706 | B1 | 10/2001 | Dattilo | 118/612 |
| 6,313,224 | B1 | 11/2001 | Singer et al. | 525/208 |
| 6,333,077 | B1 | 12/2001 | Maag et al. | 427/496 |
| 6,593,417 | B1 * | 7/2003 | Anderson et al. | 524/588 |

* cited by examiner

*Primary Examiner*—Susan Berman
(74) *Attorney, Agent, or Firm*—Carol A. Marmo; Jacques B. Miles

(57) ABSTRACT

A coating composition that can be cured by actinic or ionizing radiation is disclosed. The coating composition is made up of at least one polysiloxane compound one polysiloxane compound having the following structure (I) or (II):

$$R-\underset{R}{\overset{R}{Si}}-O-(\underset{R}{\overset{R}{Si}}-O)_n-(\underset{R^a}{\overset{R}{Si}}-O)_m-\underset{R}{\overset{R}{Si}}-R \quad \text{or} \qquad (I)$$

$$R-\underset{R^a}{\overset{R}{Si}}-O-(\underset{R}{\overset{R}{Si}}-O)_{n'}-(\underset{R^a}{\overset{R}{Si}}-O)_{m'}-\underset{R^a}{\overset{R}{Si}}-R \qquad (II)$$

wherein: m has a value of at least 2; m' ranges from 0 to 75; n ranges from 0 to 75; n' ranges from 0 to 75; each R, which may be identical or different, is selected from H, OH, a monovalent hydrocarbon group, a monovalent siloxane group, and mixtures of any of the foregoing; and $—R^a$ comprises the following structure (III):

$$—R^3—X \qquad (III)$$

wherein $—R^3$ is selected from an alkylene group, an oxyalkylene group, an alkylene aryl group, an alkenylene group, an oxyalkenylene group, and an alkenylene aryl group; and X represents a group comprising at least 2 carbamyl alkyl (meth)acrylate groups or 2 carbamyl alkyl epoxy groups.

4 Claims, No Drawings

UV CURABLE POLYSILOXANE CLEARCOAT

CROSS-REFERENCE TO RELATED APPLICATION

This application is a continuation-in-part of U.S. application Ser. No. 09/629,422 filed Jul. 31, 2000.

FIELD OF THE INVENTION

The present invention relates to coating compositions and related methods; especially coating compositions that can be cured using actinic and/or ionizing radiation.

BACKGROUND

Protective and decorative coating compositions are applied on a variety of substrates that are used to make everyday machines and appliances. For example, automobiles, trucks, washing machine doors, industrial equipment, etc. are all made from coated substrates.

Generally, after a coating composition is applied on a substrate, it is cured by some mechanism. Examples of typical curing mechanisms are thermal cure, actinic radiation cure, and ionizing radiation cure.

For certain coating applications like coating hardwood floors, paper, and furniture, coating compositions that are curable by actinic or ionizing radiation are preferred over conventional, thermally cured coatings. Coating compositions that can be cured using actinic or ionizing radiation also offer the following benefits over conventional, thermally cured coatings: (1) coatings that cure via actinic or ionizing radiation cure very fast; (2) coatings that cure via actinic or ionizing radiation do not require time consuming oven bakes; and (3) coatings that cure by actinic or ionizing radiation can be used on heat sensitive materials.

The present invention provides a novel coating composition that can be cured using actinic and/or ionizing radiation.

SUMMARY OF THE INVENTION

In one embodiment, the present invention is a coating composition curable by actinic and/or ionizing radiation comprising at least one polysiloxane compound having the following structure

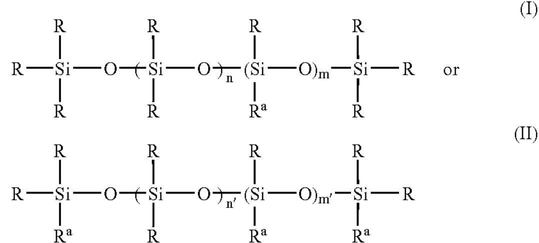

wherein: m has a value of at least 2; m' ranges from 0 to 75; n ranges from 0 to 75; n' ranges from 0 to 75; each R, which may be identical or different, is selected from H, OH, a monovalent hydrocarbon group, a monovalent siloxane group, and mixtures of any of the foregoing; and —$R^a$ comprises the following structure (III):

$$—R^3—X \quad \text{(III)}$$

wherein —$R^3$ is selected from an alkylene group, an oxyalkylene group, an alkylene aryl group, an alkenylene group, an oxyalkenylene group, and an alkenylene aryl group; and X represents a group comprising at least 2 carbamyl alkyl(meth)acrylate groups or 2 carbamyl alkyl epoxy groups.

In yet another embodiment, the present invention is a multi-layer composite coating comprising a basecoat formed from a basecoat film-forming composition and a clearcoat formed from a clearcoat film-forming composition as described above applied over at least a portion of the basecoat.

DESCRIPTION OF THE INVENTION

Other than in the operating examples, or where otherwise indicated, all numbers expressing quantities of ingredients, reaction conditions and so forth used in the specification and claims are to be understood as being modified in all instances by the term “about.” Also, it should be understood that any numerical range recited herein is intended to include all sub-ranges subsumed therein. For example, a range of “1 to 10” is intended to include all sub-ranges between and including the recited minimum value of 1 and the recited maximum value of 10, that is, having a minimum value equal to or greater than 1 and a maximum value of equal to or less than 10.

The following terms are defined for purposes of this patent as follows:

“Actinic radiation” refers to light with wavelengths of electromagnetic radiation ranging from the ultraviolet (“UV”) light range through the visible light range and into the infrared range.

“Alkenylene” refers to an acyclic or cyclic hydrocarbon group having one or more double bonds and having an alkenylene carbon chain length of $C_2$ to $C_{25}$. Nonlimiting examples of suitable alkenylene groups include those derived from propargyl alcohol and acetylenic diols, for example, 2,4,7,9-tetramethyl-5-decyne-4,7-diol which is commercially available from Air Products and Chemicals, Inc. of Allentown, Pa. as SURFYNOL 104.

“Alkylene” refers to an acyclic or cyclic, saturated hydrocarbon group having a carbon chain length of from $C_2$ to $C_{25}$. Nonlimiting examples of suitable alkylene groups include, but are not limited to, those derived from propenyl, 1-butenyl, 1-pentenyl, 1-decenyl, and 1-heneicosenyl, such as, for example $(CH_2)_3$, $(CH_2)_4$, $(CH_2)_5$, $(CH_2)_{10}$, and $(CH_2)_{23}$, respectively, as well as isoprene and myrcene.

“Alkylene aryl” refers to an acyclic alkylene group substituted with at least one aryl group, for example, phenyl, and having an alkylene carbon chain length of $C_2$ to $C_{25}$. The aryl group can be further substituted, if desired. Nonlimiting examples of suitable substituent groups for the aryl group include, but are not limited to, hydroxyl groups, benzyl groups, carboxylic acid groups, and aliphatic hydrocarbon groups. Nonlimiting examples of suitable alkylene aryl groups include, but are not limited to, those derived from styrene and 3-isopropenyl-∝,∝-dimethylbenzyl isocyanate, such as $—(CH_2)_2C_6H_4—$ and $—CH_2CH(CH_3)C_6H_3(C(CH_3)_2(NCO)$.

“Aryls” refers to to a suitable aromatic group. Suitable aromatic groups falling within this term include, but are not limited to, phenyl, naphthyl, phenanthryl, phenalenyl, anthracenyl, triphenylenyl, fluoranthenyl, pyrenyl, pentacenyl, chrysenyl, naphthacenyl, hexaphenyl, picenyl, and perylenyl (preferably phenyl and naphthyl), in which each hydrogen atom may be substituted with methyl, a halide or group containing one or more of oxygen, nitrogen, and sulfur.

"Heteroatoms" refers to elements other than carbon for example oxygen, nitrogen, and halogen atoms.

"Hydrocarbon groups" refers to both branched and unbranched hydrocarbon groups.

"Ionizing radiation" refers to high energy radiation (from 30,000 electron volts to 300,000 electron volts) including the secondary energies resulting from the conversion of electron or other particle energy into neutron or gamma radiation. Examples of ionizing radiation include X-rays, gamma rays, beta rays, and the radiation produced by accelerated high energy electrons or electron beam devices.

"Lower alkyl" refers to alkyl groups having from 1 to 6 carbon atoms. One or more of the hydrogen atoms of the hydrocarbon can be substituted with heteroatoms.

"(Meth)acrylate" refers to both acrylate and methacrylate and is defined conventionally as in the art.

"Monovalent" refers to a substituent group that forms only one single, covalent bond. For example, a monovalent group on a polysiloxane will form one single covalent bond to a silicon atom in the backbone of the polysiloxane polymer.

"Monovalent hydrocarbon group" refers to a monovalent group having a backbone repeating unit based exclusively on carbon. In a "monovalent hydrocarbon group," the hydrocarbon group can be branched or unbranched, acyclic or cyclic, saturated or unsaturated, or aromatic, and can contain from 1 to 24 (or in the case of an aromatic group from 3 to 24) carbon atoms. Nonlimiting examples of such hydrocarbon groups include alkyl, alkoxy, aryl, alkaryl, and alkoxyaryl groups.

"Oxyalkylene" refers to an alkylene group containing at least one oxygen atom bonded to, and interposed between, two carbon atoms and having an alkylene carbon chain length of from $C_2$ to $C_{25}$. Nonlimiting examples of suitable oxyalkylene groups include those derived from trimethylolpropane monoallyl ether, trimethylolpropane diallyl ether, pentaerythritol monoallyl ether, polyethoxylated allyl alcohol, and polypropoxylated allyl alcohol, such as $—(CH_2)_3OCH_2C(CH_2OH)_2(CH_2CH_2—)$.

"Oxyalkynylene" refers to to an alkynylene group containing at least one oxygen atom bonded to, and interposed between two carbon atoms, having two free valences, and having an alkynylene carbon chain length of from $C_2$ to $C_{25}$.

"Siloxane" refers to a group comprising a backbone comprising at least one of the following groups: $R^1_n R^2_m SiO_{(4-n-m)/2}$. The siloxane groups can be branched or unbranched, and linear or cyclic. The siloxane groups can be substituted with pendant organic substituent groups, for example alkyl, aryl, and alkaryl groups. The organic substituent groups can be substituted with heteroatoms, for example oxygen, nitrogen, and halogen atoms, reactive functional groups.

The present invention is a coating composition comprising at least one polysiloxane compound having the following structure (I) or (II):

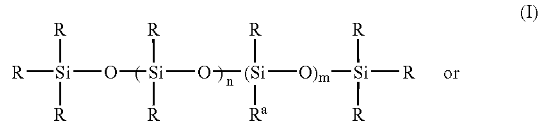

-continued

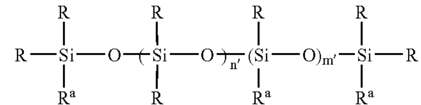

wherein: m has a value of at least 2; m' ranges from 0 to 75; n ranges from 0 to 75; n' ranges from 0 to 75; each R, which may be identical or different, is selected from H, OH, a monovalent hydrocarbon group, a monovalent siloxane group, and mixtures of any of the foregoing; and —Ra comprises the following structure (III):

—R3-X (III)

wherein —R3 is selected from an alkylene group, an oxyalkylene group, an alkylene aryl group, an alkenylene group, an oxyalkenylene group, an alkynylene group and an alkenylene aryl group; and X represents a group comprising at least 2 carbamyl alkyl(meth)acrylate groups or 2 carbamyl alkyl epoxy groups.

Formulae (I) and (II) are diagrammatic, and are not intended to imply that the parenthetical portions are necessarily blocks, although blocks may be used where desired.

In some cases the polysiloxane compound may comprise a variety of siloxane units. This is increasingly true as the number of siloxane units employed increases, and especially true when mixtures of a number of different siloxane units are used. In those instances where a plurality of siloxane units are used and it is desired to form blocks, oligomers can be formed which can be joined to form the block compound. By judicious choice of reactants, compounds having an alternating structure or blocks of alternating structure may be used.

In one embodiment, the present invention is directed to a coating composition comprising the polysiloxane compound as previously described in which the substituent group R3 represents an oxyalkylene group. In another embodiment, R3 represents an oxyalkylene group.

In another embodiment, the present invention is directed to any coating composition prepared from components as previously described comprising at least one polysiloxane having the structure (I) or (II) described above, wherein (n+m) ranges from 2 to 9. In yet another embodiment, the components can comprise at least one polysiloxane having the structure (I) or (II) described above, (n+m) ranges from 2 to 3.

In another embodiment, the components can comprise at least one polysiloxane having the structure (I) or (II) described above, (n'+m') ranges from 2 to 9. In another embodiment, the components can comprise at least one polysiloxane having the structure (I) or (II) described above, (n'+m') ranges from 2 to 3.

In one embodiment, the present invention is directed to any coating composition as previously described in which the components comprise at least one polysiloxane compound in which X represents

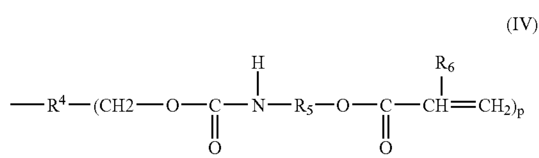

wherein when p is 2, $R_3$ is $C_1$ to $C_4$ alkylene, $R_4$ is —$R_3$—O—$CH_2$—CR— where R is an alkyl group, $R_5$ is $C_2$ to $C_4$ alkylene, and $R_6$ is a methyl group or hydrogen and when p is 3, $R_3$ is $C_1$–$C_4$ alkylene, $R_4$ represents $R_3$—O—$CH_2$—C—, $R_5$ is $C_2$ to $C_4$ alkylene, and $R_6$ is a methyl group or hydrogen The polysiloxane compound can be prepared by reacting a polysiloxane polyol with an isocyanate functional acrylate or methacrylate. Examples of suitable polysiloxane polyols are described in U.S. Pat. No. 6,040,394 which is hereby incorporated by reference.

Examples of isocyanate functional (meth)acrylates include isocyanatoalkyl(meth)acrylates such as isocyanatoethyl acrylate, isocyanatopropyl acrylate, isocyanatobutyl acrylate, isocyanatoethyl methacrylate, isocyanatopropyl methacrylate and isocyanatobutyl methacrylate; isocyanatoalkyl crotonates such as isocyanatobutyl crotonate; and isocyanate-functional monoalkenyl aromatic monomers such as alpha-methylstyrene-meta-isopropyl isocyanate and alpha-methylstyrene-para-isopropyl isocyanate.

Suitable isocyanate-functional ethylenically unsaturated compounds having one or more urethane groups can be prepared by the reaction of isocyanates with ethylenically unsaturated alcohols in the appropriate molar amounts to provide a predominance of mono-isocyanate-functional ethylenically unsaturated compounds. Suitable isocyanates include any known di- or polyisocyanates that, when reacted with the alcohol, form an isocyanate-functional ethylenically unsaturated compound having a predominance of monoisocyanate functionality; "predominance" means at least about 50 percent. Examples of suitable isocyanates include diphenylmethane diisocyanate, 1,6-hexamethylene diisocyanate and 3,5-toluene diisocyanate.

Examples of suitable ethylenically unsaturated alcohols include acrylic functional monohydric alcohols such as hydroxyethyl acrylate, hydroxypropyl acrylate, hydroxybutyl acrylate, hydroxyethyl methacrylate, hydroxypropyl methacrylate and hydroxybutyl methacrylate; hydroxyalkyl crotonates such as hydroxybutyl crotonate; and allyl ethers of polyhydric alcohols such as trimethylolpropane diallyl ether, ethylene glycol monoallyl ether and pentaerythritol triallyl ether. Other suitable polyisocyanates include diisocyanates, such as 2,6-toluene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, 1,6-hexane diisocyanate, isophorone diisocyanate, methylenebis(4-cyclohexyl)isocyanate, 2,2,4-trimethylhexamethylene diisocyanate, bis(2-isocyanate-ethyl) fumarate, 6-isopropyl-1,3-phenyl diisocyanate, 4-diphenylpropane diisocyanate, lysine diisocyanate, hydrogenated diphenylmethane diisocyanate, hydrogenated xylylene diisocyanate, tetramethylxylylene diisocyanate, and 2,5 (or 6)-bis(isocyanatemethyl)-bicyclo [2,2,1]heptane.

The isocyanate functional acrylate or methacrylate can also be comprised of di- and polyisocyanates having isocyanate groups differing in reactivity caused, for example, by stearic hindrance. Examples of such compounds include 2,4-toluene diisocyanate; mixtures of toluene diisocyanates having a majority of the species having differing activity such as 80 percent 2,4-toluene diisocyanate and 20 percent 2,6-toluene diisocyanate by weight; and isophorone diisocyanate.

The isocyanate(meth)acrylate can be purchased commercially. For example, 2-methacryloyloxyethyl isocyanate ("MOI") which is commercially available from Showa Denko America Inc. in New York, N.Y.

Beside acrylate or methacrylate functionality, the polysiloxane compound can also be prepared with epoxy functionality in which the polysiloxane polyol as described above is reacted with an isocyanato functional epoxy compound. Such compounds can be prepared by reaction of di- or polyisocyanate as described above with a hydroxyfunctional epoxy compound such as glycidol.

In the practice of the present invention, the ratio of the functionality on the polysiloxane compound to the NCO-functionality on the NCO-functional (meth)acrylate or epoxy compound can rage from 1:99 to 99:1. In one non-limiting embodiment of the invention, the ratio of OH-functionality to NCO-functionality is 1:1. In another non-limiting embodiment of the invention, the ratio of OH-functionality to NCO-functionality ranges from 9:1 to 1:9.

The stoichiometric ratios of the reactive functionality can be manipulated to obtain coating compositions with different properties. For example, a siloxane compound containing hydroxy groups can be reacted with the NCO-functional methacrylate or epoxy compound in a manner that leaves excess hydroxyl groups which can be cured by thermally. One of ordinary skill in the art will know how to vary the stoichiometric ratios of the reactants to obtain coating compositions having different properties.

The present invention encompasses a coating composition comprising the reaction product described above. The reaction product can be present in a coating composition according to the present invention in an amount ranging from about 2.0 to 95.0 weight percent based on the total weight of the coating composition.

The coating composition of the present invention can further comprise at least one free radical photoinitiator and/or cationic cure initiator. Examples of suitable free radical photoinitiators include benzophenones, acetophenone derivatives, such as alpha-hydroxyalkylphenylketones, benzoins such as benzoin alkyl ethers and benzyl ketals, monoacylphosphine oxides, and bisacylphosphine oxides. Suitable free radical photoinitiators are commercially available from Ciba Specialty Chemicals Corporation as IRGACURE 184, IRGACURE 651, DURACURE 1173, and DURACURE 4265. The free radical photoinitiator can be present in the coating composition of the present invention in an amount ranging from about 0.1 to 15.0 weight percent based on the total weight of the coating composition.

Examples of suitable cationic initiators include triaryl sulfonium salts and diaryliodonium salts having non-nucleophilic anions such as hexafluorophosphate, hexafluoroantimonate, tetrafluoroborate and hexafluoroarsenate. The cationic initiator can be present in the coating composition of the present invention in an amount ranging from about 0.1 to 15.0 weight percent based on the total weight of the coating composition.

The coating composition of the present invention can be made using techniques well known to those skilled in the art. Typically, the various ingredients are mixed together in any order that permits sufficient compatibility of the ingredients under agitation at ambient conditions.

The coating composition of the present invention can be applied to a variety of substrates. Examples of suitable substrates include steel, metal, plastic, wood, glass, etc. The coating composition of the present invention can be applied by methods that are well known in the art. For example, the coating composition can be applied by spraying, by electrostatic spraying (in the case of a metal substrate), by the use of a fluidized bed, brushing, dipping or flowing. The coating can be applied in a single sweep or in several passes. After curing, the thickness of the coating can range from about 0.1 to 10.0 mils or about 1.0 to 2.0 mils.

After the coating composition of the present invention has been applied on a substrate, the composition will be cured by actinic and/or ionizing radiation. Curing the coating composition using actinic and/or ionizing radiation involves exposing the coated substrate to a suitable source of radiation. Suitable sources of actinic radiation and ionizing radiation are well known in the art.

For example, suitable sources of actinic radiation include mercury arcs, carbon arcs, low, medium or high pressure mercury lamps, swirl-flow plasma arcs and ultraviolet light emitting diodes. Typically, the actinic radiation source will have wavelengths of electromagnetic radiation ranging from 150 to 2,000 nanometers (nm) or from 180 to 1,000 nm or from 200 to 500 nm.

For example, a suitable source of ionizing radiation is an electron beam.

A person having ordinary skill in the art will know which actinic or ionizing radiation source to use and what the appropriate conditions should be to obtain a satisfactory cure.

Coating compositions according to the present invention are particularly useful as clearcoats such as those that can be applied over a colored primer coat or a colored topcoat.

The present invention is also directed to a method for improving the scratch and abrasion resistance of a coated substrate that comprises applying to at least a portion of the substrate the coating composition of the invention and curing the applied coating composition.

EXAMPLES

The following examples are intended to illustrate the invention and should not be construed as limiting the invention in any way. The preparation of the exemplary compositions is described below.

A siloxane polyol used to make siloxane acrylate was prepared in the following manner: Charge I (see table below) and an amount of sodium bicarbonate equivalent to 20 to 25 parts per million ("ppm") of total monomer solids was added to a suitable reaction vessel equipped with a means for maintaining a nitrogen blanket at ambient conditions and then the temperature was gradually increased to 75° C. under a nitrogen blanket. When the temperature reached 75° C., about 5.0% of Charge II (see table below) was added to the mixture under agitation followed by the addition of Charge III (see table below), equivalent to 10 ppm of active platinum based on total monomer solids. The reaction was then allowed to exotherm to 95° C. at which time the remainder of Charge II was added at a rate such that the temperature did not exceed 95° C. After all of Charge II was added to the mixture, the reaction temperature was maintained at 95° C. and monitored by infrared spectroscopy for the disappearance of the silicon hydride absorption band (Si—H, 2150 cm-1).

| Ingredients | Equivalent Weight[2] | Equivalents | Parts By Weight (kilograms) |
|---|---|---|---|
| Charge I: | | | |
| Trimethylolpropane monoallyl ether | 174.0 | 756.0 | 131.54 |
| Charge II: | | | |
| MASILWAX BASE[1] | 156.7[2] | 594.8 | 93.21 |
| Charge III: | | | |
| Chloroplatinic acid | | 10 ppm | |
| Toluene | | | 0.23 |
| Isopropanol | | | .07 |

[1]Polysiloxane-containing silicon hydride, commercially available from BASF Corporation.

[2]Equivalent weight based on mercuric bichloride determination.

A siloxane acrylate used to make Examples 1 and 2 was prepared in the following manner: 400 gram (2.37 hydroxyl equivalents) of siloxane polyol (its preparation is described above), 0.2 gram of dibutyl tin dilaurate, and 0.5 gram of 2,6-di-t-butyl-4-methyl-phenol were added to a suitable flask equipped with a stirrer, thermocouple and condenser. This mixture was heated to 50° C. and 310.0 gram (2.0 equivalents) of 2-methacryloyloxyethyl isocyanate was added over 2 hours 30 minutes. The temperature was maintained below 60° C. during the isocyanate addition. The temperature of the reaction mixture was held at 60° C. until the disappearance of the isocyanate group absorption in the infrared spectrum. The number average molecular weight of the resulting product was 1167.

To form Examples 1 and 2, the specified amounts of the compounds shown in Table 1 were added to a batch and mixed.

TABLE 1

Compositional Information for the Exemplary Compositions

| Component [g] | Example 1 | Example 2 |
|---|---|---|
| DESN 3300[1] | 5.85 | 5.63 |
| Acrylic Polyol[2] | 15.85 | 15.27 |
| Darocure 4265[3] | 1.3 | 1.25 |
| Tinuvin 400[4] | 1.92 | 1.86 |
| Tinuvin 292[5] | 0.65 | 0.63 |
| Siloxane Acrylate | 39.94 | 42.65 |
| Highlink OG 108-32[6] | 4.33 | none |
| Xylene | 30.16 | 32.71 |

[1]Isocyanate which is commercially available from Bayer Corporation.

[2]Acrylic polyol made from 4.5% butyl methacrylate, 14.9% butyl acrylate, 20.4% hydroxyethyl methacrylate, 27.6% isobornyl methacrylate and 22.6% hydroxypropyl methacrylate having a Mw of 6000 and a OH number of 176 on solids.

[3]Photoinitiator which is commercially available from CIBA Specialty Chemicals.

[4]UV absorber which is commercially available from CIBA Specialty Chemicals.

[5]Hindered amine light stabilizers from CIBA Specialty Chemicals.

[6]Colloidal silica dispersion commercially available from Clariant.

For evaluation purposes, coated test panels were prepared in the following manner: first, a 4" by 12" steel panel that had been coated with ED 5000, commercially available Electrocoat from PPG Industries, Inc., was coated with BWB-8555, a black water-based basecoat commercially available from PPG Industries, Inc. The basecoat was spray applied to a dry film thickness of 0.5 mils, was flashed for five minutes at ambient temperature, and then thermally baked for 30 minutes at 285° F. Second, one of the example coatings was applied as a clear topcoat over the baseocat with a #28 drawdown rod commercially available from the Paul N. Gardner Company, Inc. The clear topcoat dry film thickness was 0.8–1.0 mils. Third, the clear topcoat was cured by exposure to 575 mJ/cm$^2$ of UV radiation in an inert, nitrogen atmosphere and by baking in a 285° F. oven for thirty minutes.

Table 2 shows the performance attributes of panels coated with the exemplary compositions.

TABLE 2

Performance Results for Panels Coated with Examples 1 and 2

| | Initial Gloss | Scratch Resistance Gloss[1] | % Gloss Reten-tion | Scratch Resistance after Laboratory Car Wash Test[2] | % Gloss Reten-tion | Acid Etch Rating[3] |
|---|---|---|---|---|---|---|
| Exam-ple 1 | 80 | 56, 52 > 54 | 68 | 66 | 83 | 2–3 |
| Exam-ple 2 | 90 | 52, 49 > 50 | 62 | 62 | 77 | 3 |

[1]Atlas Scratch Tester CM-9 Micron Test as described in STM-8061.
[2]The Scratch Resistance after Laboratory Car Wash Test was performed as follows: The panels were placed upon a moving table in an AMTEC car wash machine available from Amtec Kistler of Prittriching, Germany and tested for ten car wash cycles. The car wash machine used the standard Sikron SH 200 quartz powder in water as the abrasive material. The testing was done according to the DIN 55668 test method. The 20° gloss of the test panel was recorded before and after the ten cycle car wash test.
[3]The Acid Etch Rating was determined in the following manner: A solution of 1.5 grams of 0.2 Normal Sulfuric Acid available from Fisher Scientific and 29.8 grams of deionized water was prepared. Drops of this solution were placed upon the coated steel test panels using a 50 microliter octapipette available from Fisher Scientific. The panels were placed into a 120° F. oven for twenty minutes to dry the drops of acid water. The acid water was reapplied using the octapipette over the original spots and again dried in a 120° F. oven for 20 minutes. The acid application was repeated a third time so that the same spots on the panels were exposed to acid solution for a total of one hour at 120° F. The panels were removed from the oven and carefully washed with deionized water and dried with a soft cloth. The panels were visually rated for severity of acid damage. The rating scale is from 0 to 10. A "0" rating is for no visible damage, and a "10" rating is for severe damage that penetrates the coating. Ratings of 2 to 3 show very slight acid damage.

A third coating example, Example 3, was prepared from 9.51 parts by weight of the siloxane acrylate described above, and 0.49 parts by weight of Darocure 1173 which is commercially available from Ciba Specialty Chemical Corporation. The ingredients were added to a paint can and mixed by hand with a wooden tongue depressor. After mixing, the sample was placed in a 120° F. oven overnight to facilitate the incorporation of the photoinitiator.

A substrate coated with Example 3 was prepared for evaluation purposes in the following manner: an ED 5000 electrocoated 4" by 12" steel panel was basecoated with an ED 5000 was coated with BWB-8555 basecoat. BWB-8555 basecoat is a black waterbased acrylic/melamine basecoat commercially available from PPG Industries, Inc. The basecoat was spray applied to a dry film thickness of 0.71 mils. The BWB-8500 was then baked for 30 minutes at 285° F. before a clear topcoat was applied. The clear sample was applied with a #7 drawdown rod available from the Paul N. Gardner Company, Inc. The clear topcoat dry film thickness was 0.3 mils. The clear topcoat was then cured by exposure to 400 mJ/cm$^2$ of UV radiation in an inert, nitrogen atmosphere. The performance properties of the coated panel are shown in Table 3.

TABLE 3

Performance Results for a Panel Coated with Example 3

| Test Methodology | Test Results |
|---|---|
| 20° Gloss[1] | 81 |
| Knoop Hardness (Tukon)[2] | 7.3 |
| Scratch Resistance[3] | 72.5% |

[1]20° gloss was measured with a statistical Novo-Gloss 20° gloss meter, available from Paul N. Gardner, Inc.
[2]Knoop hardness is a hardness measurement derived from the size of an indentation in the coating made using the Tukon Microhardness Instrument. The Tukon Microhardness Instrument makes an indentation in a cured coating by applying a 25 gram load to the surface with a diamond tip. The size of the indentation is measured using a microscope. The indentation size is then converted to the Knoop Hardness measurement. The Tukon Microhardness Instrument used was the Tukon Microhardness Tester Model 3000 manufactured by Wilson Instruments, Division of Instron Corporation.
[3]Coated panels were subjected to scratch testing by linearly scratching the coated surface with a weighted abrasive paper for ten double rubs using an Atlas AATCC Scratch Tester, Model CM-5, available from Atlas Electrical Devices Company of Chicago, Illinois. The abrasive paper used was 3M 281Q WETORDRY ™ PRODUCTION ™ 9 micron polishing paper sheets, which are commercially available from 3M Company of St. Paul, Minnesota. Panels were then rinsed with tap water and carefully patted dry with a paper towel. The 20° gloss was measured (using the same gloss meter as that used for the initial 20° gloss) on the scratched area of each test panel. Using the lowest 20° gloss reading from the scratched area, the scratch results are reported as the percent of the initial retained after scratch testing using the following calculation: 100% * scratched gloss/initial gloss. Higher values for percent of gloss retained are desirable.

CONCLUSION

The performance data shows cured films can be achieved that have the desired properties using a coating composition according to the present invention

What is claimed is:

1. A coating composition curable by actinic and/or ionizing radiation comprising at least one polysiloxane compound of the following structure

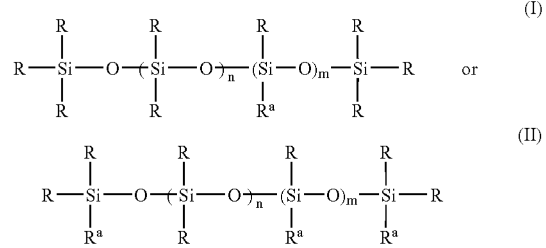

wherein: m has a value of at least 2; m' ranges from 0 to 75; n ranges from 0 to 75; n' ranges from 0 to 75; each R, which may be identical or different, is selected from H, OH, a monovalent hydrocarbon group, a monovalent siloxane group, and mixtures of any of the foregoin; and —$R^a$ comprises the following structure (III):

—$R^3$—X (III)

wherein $R^3$ is $C_1$ to $C_4$ alkylene, and wherein X is

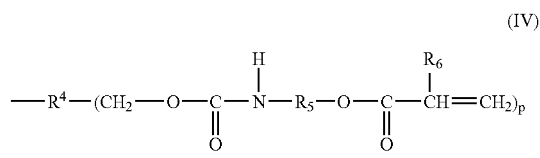

wherein p is 2 or 3 and when p is 2, $R_4$ is —O—$CH_2$—CR— where R is an alkyl group, $R_5$ is $C_2$ to $C_4$ alkylene, and $R_6$ is a methyl group and when p is 3, $R_4$ represents —O—$CH_2$—C—, $R_5$ is $C_2$ to $C_4$ alkylene, and $R_6$ is a methyl group or hydrogen.

2. A multi-layer composite coating comprising a basecoat formed from a basecoat film-forming composition and a clearcoat formed from a clearcoat film-forming composition according to claim 1 applied and cured over at least a portion of the basecoat.

3. The multi-layer composite coating according to claim 2 wherein the clearcoat film-forming composition further comprises at least one free radical photoinitiator.

4. The multi-layer composite coating according to claim 3 wherein the free radical photoinitiator is an alpha-hydroxyphenylketone.

* * * * *